(12) United States Patent
Charles

(10) Patent No.: US 12,093,404 B2
(45) Date of Patent: Sep. 17, 2024

(54) DISTRIBUTED SECURE ENCLAVE FOR MODERN ENTERPRISE NETWORKS AND CRITICAL INFORMATION SYSTEMS

(71) Applicant: Curuvar, LLC, Celebration, FL (US)

(72) Inventor: James Radford Charles, Baltimore, MD (US)

(73) Assignee: Curuvar, LLC, Celebration, FL (US)

( * ) Notice: Subject to any disclaimer, the term of this patent is extended or adjusted under 35 U.S.C. 154(b) by 179 days.

(21) Appl. No.: 17/465,358

(22) Filed: Sep. 2, 2021

(65) Prior Publication Data

US 2022/0067176 A1 Mar. 3, 2022

Related U.S. Application Data

(60) Provisional application No. 63/073,616, filed on Sep. 2, 2020.

(51) Int. Cl.
*G06F 21/60* (2013.01)
*H04L 9/08* (2006.01)

(52) U.S. Cl.
CPC ............ *G06F 21/602* (2013.01); *H04L 9/085* (2013.01); *H04L 2209/463* (2013.01)

(58) Field of Classification Search
CPC .. G06F 21/602; H04L 9/085; H04L 2209/463
See application file for complete search history.

(56) References Cited

U.S. PATENT DOCUMENTS

| | | | |
|---|---|---|---|
| 2019/0012466 A1* | 1/2019 | Ricotta | H04L 63/102 |
| 2019/0273617 A1* | 9/2019 | Maher | H04L 9/085 |
| 2019/0289013 A1* | 9/2019 | Makmel | H04L 63/0876 |
| 2020/0067907 A1* | 2/2020 | Avetisov | H04L 9/3234 |

* cited by examiner

*Primary Examiner* — Benjamin E Lanier
*Assistant Examiner* — Zoha Piyadehghibi Tafaghodi
(74) *Attorney, Agent, or Firm* — THE MARBURY LAW GROUP, PLLC

(57) ABSTRACT

In various embodiments a plurality of computing devices may perform methods for providing information security services for a communication network, including performing a consensus operation to determine whether a client device is authorized to request a document operation, wherein each computing device is assigned to one of a plurality of trust zones each including a number of computing devices less than or equal to a threshold number of computing devices, and performing the document operation for the client device in response to determining by the plurality of computing devices that consensus exists among the plurality of trust zones that the client device is authorized to request the document operation.

14 Claims, 13 Drawing Sheets

DISTRIBUTED SECURE ENCLAVE FOR MODERN ENTERPRISE NETWORKS AND CRITICAL INFORMATION SYSTEMS

RELATED APPLICATIONS

This application claims the benefit of priority to U.S. Provisional Patent Application No. 63/073,616 entitled "Distributed Secure Enclave For Modern Enterprise Networks And Critical Information Systems" filed Sep. 2, 2020, the entire contents of which are incorporated herein by reference for all purposes.

SUMMARY

Various aspects include methods that may be performed by a plurality of computing devices in a system for providing information security services for a communication network. Various aspects may include performing, by the plurality of computing devices, a consensus operation to determine whether a client device is authorized to request a document operation, wherein each computing device is assigned to one of a plurality of trust zones each including a number of computing devices less than or equal to a threshold number of computing devices, performing the document operation for the client device in response to determining by the plurality of computing devices that consensus exists among the plurality of trust zones that the client device is authorized to request the document operation.

In some aspects, performing, by the plurality of computing devices, a consensus operation to determine whether the client device is authorized to request a document operation may include performing, by the plurality of computing devices, a consensus operation to determine whether the client device is authorized to request a document operation in response to receiving a request from a client device for a document operation to be performed by the communication network. In some aspects, performing, by the plurality of computing devices, a consensus operation to determine whether the client device is authorized to request a document operation may include generating an access policy by the consensus operation indicating whether the client device is authorized to request a document operation, and applying the access policy to a request from the client device to perform the document operation.

In some aspects, the document operations may include one of storing information in the communication network, retrieving information from the communication network, entering information into the communication network for encryption, or obtaining information from the communication network for decryption. In some aspects, performing a consensus operation to determine whether a client device is authorized to request a document operation may include performing the consensus operation to determine whether a client device is authorized to request partial decryption shares for encrypted information stored in the communication network.

In some aspects, performing the document operation in response to determining by the plurality of computing devices that consensus exists among the plurality of trust zones that the client device is authorized to request the document operation may include sending to the client device the partial decryption shares in response in response to determining by the plurality of computing devices that the client device is authorized to request the partial decryption shares for encrypted information stored in the communication network. Some aspects may include the plurality of computing devices may be configured to perform the consensus operation using one or more of different operating systems, different applications, or different versions of application software. Some aspects may include selecting a computing device from among the plurality of computing devices, reverting the selected computing device to a known good state, and performing by at least some of the plurality of computing devices a consensus operation to recover state information for the reverted computing device.

Some aspects may include performing, by at least a participating subset of the plurality of computing devices, a distributed key generation operation to generate a public encryption key available to each computing device and a partial decryption key share that is different for each of the computing devices of the participating subset. In some aspects, performing, by at least a participating subset of the plurality of computing devices, a distributed key generation operation to generate a public encryption key available to each computing device and a partial decryption key share that is different for each of the computing devices of the participating subset may include performing a first distributed key generation operation during a first time period to generate a first partial decryption key share that is different for each of the computing devices of the participating subset, and performing a second distributed key generation operation during a second time period to generate a second partial decryption key share that is different for each of the computing devices of the participating subset, wherein the first time period and the second time period are defined by the performance of the consensus operation by the plurality of computing devices. In such aspects, the computing devices of the participating subset may use the first partial decryption key share during the second time period. Some aspects may include performing a second verifiable secret redistribution operation during a third time period to generate a third partial decryption key share that is different for each of the computing devices of the participating subset.

In some aspects, performing, by the plurality of computing devices, a consensus operation to determine whether the client device is authorized to request the document operation may include performing Byzantine Fault Tolerant State Machine Replication operations to determine whether a consensus exists among the plurality of computing devices that the client device is authorized to request the document operation. In some aspects, performing, by the plurality of computing devices, a consensus operation to determine whether the client device is authorized to request the document operation may include each of the plurality of computing devices performing an independent consensus operation and sharing the results via a distributed ledger.

Further aspects may include a computing device having a processor configured to perform one or more operations of any of the methods described above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
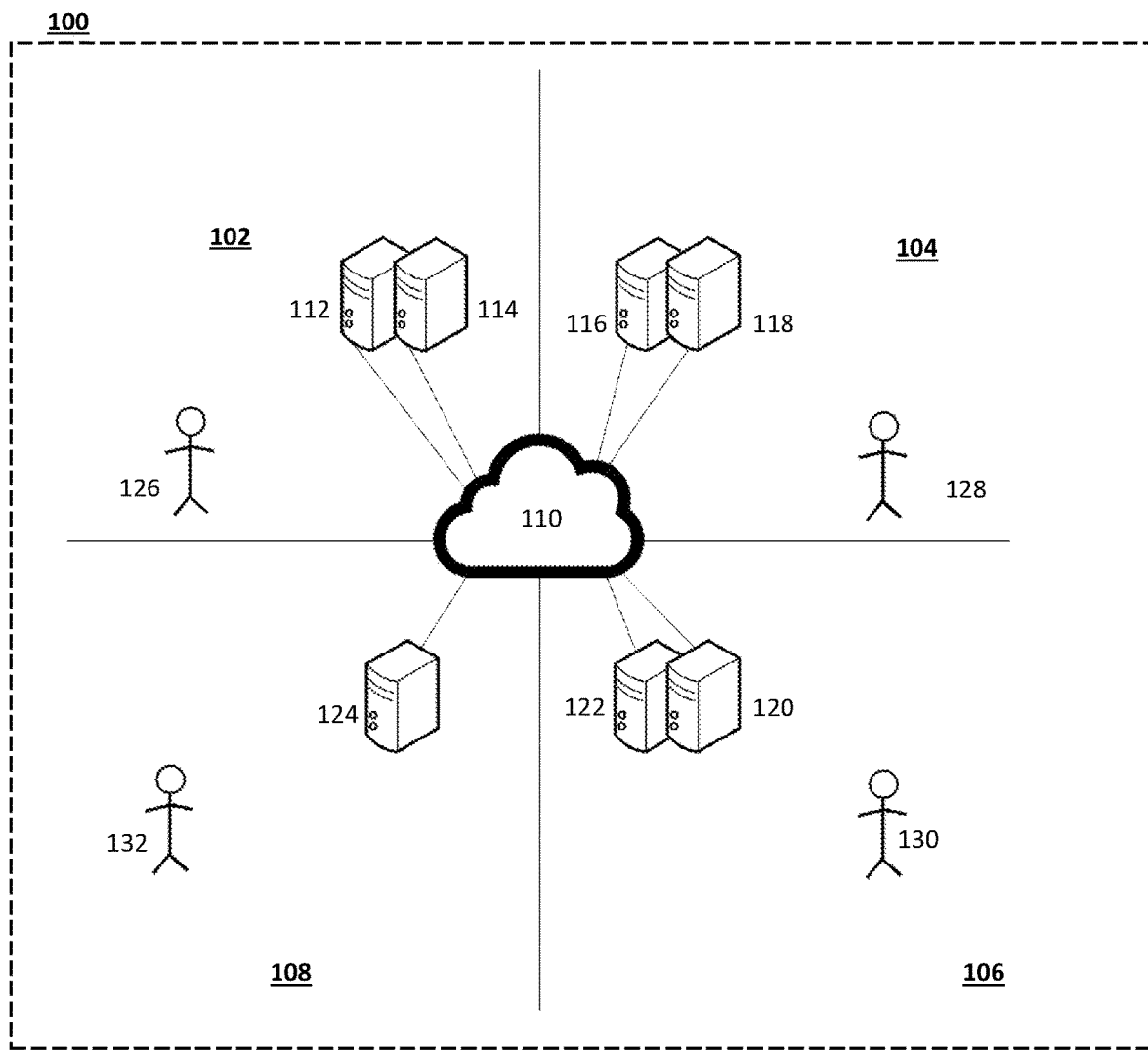
FIG. 1 is a system diagram illustrating an example deployment of a system according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "computing device," "network node", and "node" refer to any computing device capable of functioning as an element of a communication network, such as a server (e.g., an application server, master exchange server, document server, content server, or any other type of server). A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," and "communication network" may interchangeably refer to a portion or all of a wired and/or wireless communication network. A communication network may include processing nodes, routers, gateways, and physical and/or wireless data links for carrying data among various network elements, including combinations thereof, and may include a local area network, a wide area network, and an internetwork (including the Internet). Wired communication links may include, for example, twisted pair cable, coaxial cable or fiber optic cable, or combinations thereof. Wireless communication links may include a radio frequency, microwave, infrared, or other similar signal. Wired network protocols that may be utilized by the communication network include Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may also include a wireless network, including base stations, wireless communication nodes, telephony switches, internet routers, network gateways, computer systems, communication links, or some other type of communication equipment, and combinations thereof. Wireless network protocols that may be utilized by the communication network may include Institute for Electrical and Electronics Engineers (IEEE) 802.11 protocols (e.g., Wi-Fi), IEEE 802.15 protocols, IEEE 802.16 protocols, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP) protocols such as Third Generation (3G), Fourth Generation (4G), Fifth Generation (5G), Sixth Generation (6G) protocols, and so forth. The communication network may also include combinations of the foregoing. Other network elements may be present in the communication network that are omitted from description for clarity, including additional processing nodes, routers, gateways, and physical and/or wireless data links, and in the case of wireless communications systems may further include base stations, base station controllers, gateways, call controllers, and location registers such as a home location register or visitor location register.

As used herein, a "secret decryption key share" (sometimes alternatively referred to as a "decryption key share" or "partial decryption key") refers to a portion or piece of a cryptographic key held by a node (e.g., generated via distributed key generation (DKG) or verifiable secret redistribution (VSR)), as further described below.

As used herein, a "partial decryption share" refers to the product of a single node (e.g., using a decryption key share). For example, when an authorized client requests a decryption of a specific ciphertext, one or more nodes may provide a partial decryption share of the specific ciphertext.

Various embodiments include methods and communication systems configured to perform the methods of providing information security services for a communication system or network. A communication network configured to employ the various methods may be referred to as a Distributed Secure Enclave (DSE). Some embodiments employ a Byzantine Fault Tolerant (BFT) consensus mechanism to manage access to and consistency of information stored in the communication system. In some embodiments, the communication network may be configured into trust zones that each include a plurality of computing devices. In some embodiments, each trust zone may be configured with a base number of computing devices (nodes). In some embodiments, each trust zone may be configured with a number of computing devices that is less than a threshold number of the total number of nodes in the communication network (for example, no more than one-third of the total number of nodes), sometimes referred to herein as a "BFT threshold." In various embodiments, computing devices may be configured to perform BFT consensus operations as a basis for constructing a State Machine Replication (SMR) system (for example, a distributed ledger), which may be intrusion tolerant as long as the number of nodes compromised by any attacker is below the BFT threshold for the communication network. In some embodiments, consensus may be required among the trust zones to store information in the communication network (e.g., in a secure database), to retrieve information from the communication network, to enter information into the communication network for encryption, and/or to obtain information from the communication network for decryption.

Further, information may be stored in the communication network, and encryption keys may be divided and stored in the communication network, using a threshold cryptographic method. In some embodiments, management of each trust zone may be assigned to a different system administrator or network manager. In this manner, neither an attacker from outside the network nor an "insider" threat may obtain sufficient information to extract protected information from the communication network, absent the required authorization to do so determined by consensus among the various trust zones.

In various embodiments, each computing device (node) may store or have access to a decentralized state that is known to all nodes (e.g., what is determined and replicated through performing BFT SMR operations, such as a distributed ledger), portions of distributed data (e.g., information stored in the communication network), and an ephemeral state or secret state for cryptography (e.g., shares of cryptographic keys).

The communication network may be made more robust through the application of various forms of "diversity." In some embodiments, the nodes of the communication network may be configured with different software (or hardware), such as different operating systems, different applications, different versions of applications, and/or the like, sometimes referred to herein as "diversity across space." By configuring various computing devices with diversity across space, the communication network may limit the impact of a vulnerability in any one operating system, application, or other software or hardware. For example, in a communication network including a plurality of nodes, each configured with a different operating system (e.g., various forms of Linux, Windows OS, Apple macOS, etc.), a vulnerability or exploit available in one operating system may not be available in nodes configured with different operating systems. In particular, computing devices may be configured to employ diversity across space and technology such that separate computing devices perform BFT SMR operations using a variety of hardware and/or software.

Further, the communication network may be made more robust by periodically reverting each node's state to a previous known good state (i.e., a previous secure or uncompromised state), sometimes referred to herein as "diversity across time." In some embodiments, a computing device may be selected (e.g., by use of a round robin algorithm or another suitable selection method) from among a group or plurality of computing devices, and the selected computing device may be reset or reverted to an earlier state known to be secure. In some embodiments, the earlier secure state may be recovered from a secure storage (e.g., a secure ROM, CD, or other unmodifiable storage). In some embodiments, the reverted computing device may recover any lost state information from other computing devices, for example, using a consensus mechanism to prevent an attacker from introducing spurious state information into the reverted computing device. In some embodiments, the reverted computing device may be configured to validate locally stored data using a consensus mechanism to compare such data with other computing devices. In this manner, computing devices may be configured to defeat a compromise of an attack against any particular computing device. Further, a communication network configured to utilize diversity in time may assist in defending against an advanced persistent threat (APT) by forcing the APT attacker to abandon stealth and perform operations on the network to maintain its presence, which a network threat detection function or intrusion detection system may detect.

In various embodiments, the systems and methods may provide a paradigm for defending digital infrastructure and assets within a "Zero Trust" security model. The Zero Trust security model is widely considered to be a modern best practice. The Zero Trust security model was conceived with the goal of defending against potential attackers both inside and outside of the network and is commonly characterized by the principles of least privilege, multi-factor authentication, and micro-segmentation. These principles are generally effective towards protecting against many common forms of attacks, but often fall apart if the systems enforcing these controls are themselves exploited. In effect, this is a classic issue of "who watches the watchers?" However, for networks that are the targets of sophisticated adversaries, such as nation states, APTs, and/or malicious insiders, these systems often represent single points of potentially catastrophic failures if compromised.

Various embodiments may function as an intrusion-tolerant root of trust for an entire communication network, including against "insider" intruders. For example, an administrator of an embodiment system should not be able to extract any protected data from the system despite possessing physical access, privileged user access, etc. Various embodiments provide security (e.g., within defined boundaries) through an application of Byzantine fault tolerant state machine replication (BFT SMR), distributed cryptography, and proactive diversity across space and time. These techniques in concert enable systems to provide services such as secret storage/escrow, data encryption, certificate/key management, identity-based access management (IdAM), and many others in a manner that is provably secure—including in the presence of sophisticated adversaries. Various embodiments may incorporate these elements into a decentralized foundation capable of facilitating (at least) security primitives for encryption, decryption, and secure data storage/retrieval with layers of defense designed to provide intrusion tolerance for sensitive, stored data, as well as the underlying hosts/network.

Consensus Mechanism, e.g., Byzantine Fault Tolerant State Machine Replication

Some embodiments may employ Byzantine Fault Tolerant State Machine Replication (BFT SMR). BFT SMR is a class of distributed consensus protocols that may be designed to maintain correct operation in the presence of potentially malicious participants, up to a defined threshold, (e.g. one-third). Such consensus protocols have achieved particular relevance with the rise of Blockchain systems, which rely on various forms of BFT SMR to achieve consensus regarding the contents of a Distributed Ledger (DL). Generally speaking, BFT protocols enable a network of computing devices to provide (1) safety and (2) liveness. Safety (in non-rigorous terms) generally means that all updates (often referred to as "transactions" in Blockchain systems) executed by a system are agreed upon and executed in the same order by all valid network nodes. Liveness generally means that an attacker cannot prevent valid updates from being executed. A computing device or communication network may be configured to employ these BFT consensus operations as a basis for constructing an SMR system (e.g., the "ledger" in a DL system), which may be intrusion tolerant as long the number of nodes compromised by any attacker is below a BFT threshold for the system. In some embodiments (as described further below), the robustness of these nodes as participants in the BFT SMR protocol may be improved by configuring network elements to utilize diversity across space and/or time.

Diversity Across Space and Time

As described above, BFT SMR protocols may provide resilience of system safety and liveness against failure/compromise of nodes up to a defined threshold number. However, such protections may be undermined in practice by an exploit that allows an attacker to compromise (or gain incremental advantage in compromising) multiple nodes simultaneously. For example, the discovery of a vulnerability in a common piece of software/hardware may expose many nodes within a network at the same time to an attacker utilizing a single exploit, potentially defeating BFT protocol (s). Additionally, APTs and other sophisticated threat actors have been observed using initial points of compromise to gradually elevate access and spread across a network. Thus, it is highly desirable that the constituent nodes comprising the BFT SMR network are configured in a manner that is not likely to fail in the same way at the same time. Configuring computing devices of a communication network to employ proactive diversity across space and time may reduce a likelihood that these types of dependencies can be exploited by diversifying the potential attack surface and increasing the number of opportunities to potentially detect and/or remediate malicious activity.

FIG. 1 is a system diagram illustrating an example of a deployment of a system 100 according to various embodiments. The system 100 may implement diversity at an administrative level by federating nodes across trust and/or network boundaries within an organization. An enterprise network 110 may include a plurality of security/trust zones 102, 104, 106, and 108. Each security/trust zone may include a plurality of computing devices (e.g., DSE nodes) 112, 114, 116, 118, 120, 122, and 124. Each trust zone 102, 104, 106, 108 may be configured such that the number of nodes/computing devices within any one zone is less than one-third of the total number of nodes. In this manner, if an entire zone 102, 104, 106, 108 becomes unavailable or compromised, the number of nodes affected will not exceed a BFT/decryption threshold of the overall system. Additionally, each trust zone may include one or more administrators 126, 128, 130, and 132 responsible for maintaining and monitoring the nodes within their assigned zone. These administrators may only be granted privileged access to the nodes within their zone, thus ensuring that no single person has administrative control over enough nodes to violate the BFT/decryption threshold. For example, administrator 126 may only be granted privileged access to the computing devices/nodes 112 and 114.

Figure 2:
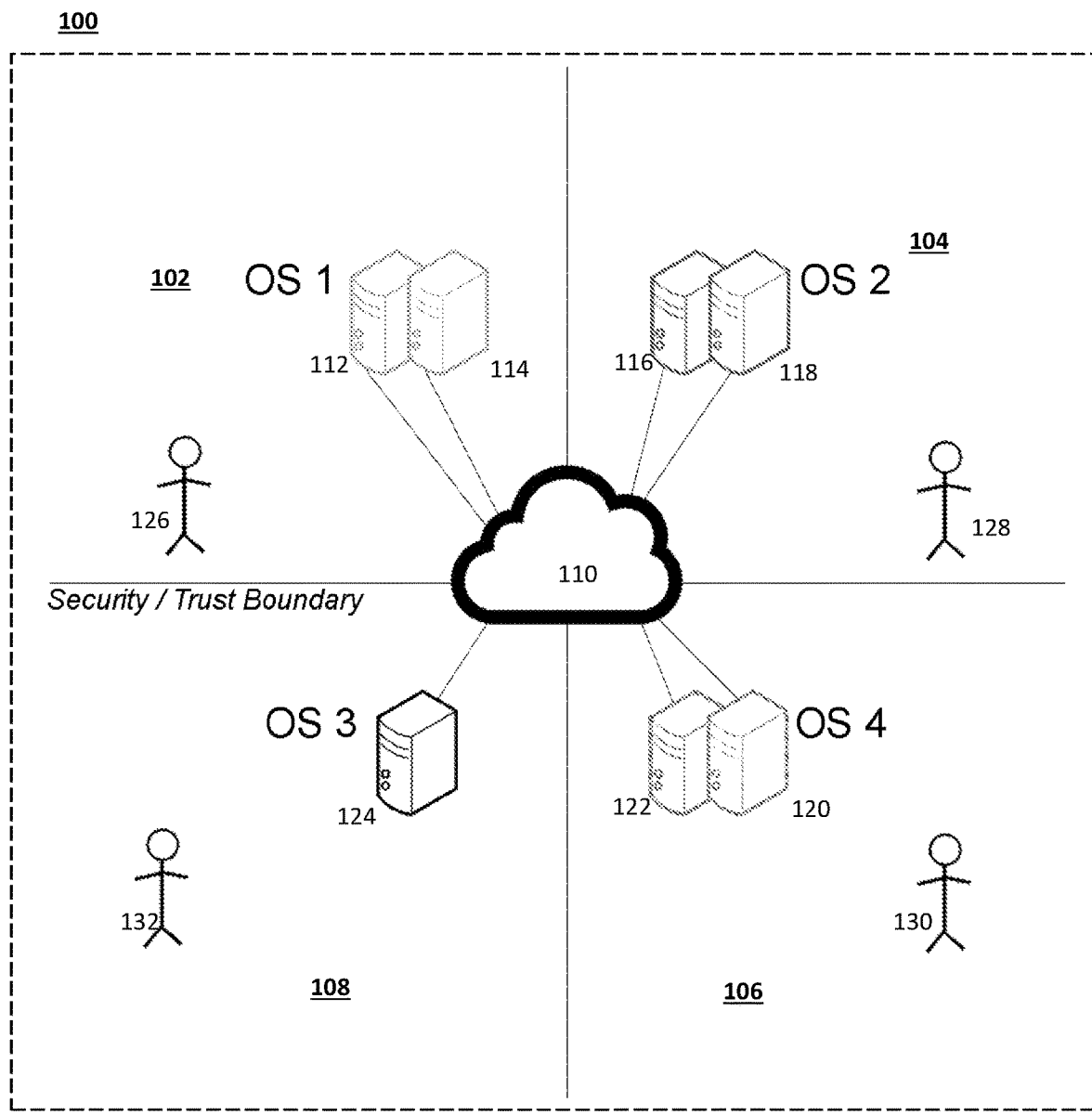
FIG. 2 is a system diagram illustrating operating system (OS) level diversity over space within an example deployment according to various embodiments.

FIG. 2 is a system diagram illustrating operating system (OS) level diversity over space, for example deployment of the system 100 according to various embodiments. With reference to FIGS. 1 and 2, the trust zones 102, 104, 106, and 108 may be configured to incorporate operating system (OS) level diversity across each trust zone. The nodes 112, 114, 116, 118, 120, 122, and 124 within each zone may be assigned an operating system (e.g., OS1, OS2, OS3, and OS4) that is meaningfully different than those used in the other zones. Examples of such operations systems may include Microsoft Windows, FreeBSD, Red Hat Enterprise Linux (RHEL), Darwin, etc. In this manner, if a critical vulnerability is discovered in one OS (e.g., OS1), the potential exposure of the system 100 may be limited to a single trust zone (e.g., 102), and thus less than one-third of the total number of nodes may be exposed or vulnerable. Trust zone diversity is not limited to a diversity of operating systems, and in various embodiments other aspects of the system's implementation may be varied or diversified, such as hardware components, network architecture, security countermeasures, etc. In various embodiments, the discovery of a critical vulnerability in a single piece of hardware or software may result in the compromise of a subset of the BFT SMR below the critical threshold.

Diversity across time refers to restoring and potentially altering the "genetics" of an individual system on a periodic basis. At the host level, this can involve a trusted component capable of periodically power cycling an individual node, re-instantiating the node from a known secure state (e.g. a physical, read-only medium), and then repeating this process for each other node in the system in a round-robin fashion. This may eliminate many forms of potential unexpected, unknown, or undesirable state from the individual machine such as, for example, memory-based exploits, configuration changes, or other non-deterministic state changes caused by an attacker through some kind of vulnerability.

Although an adversary can potentially automate exploitation to regain control of a machine after a clean restart, they will risk triggering intrusion detection system (IDS) alerts each time they perform actions against the restarted device. In various embodiments, an adversary may not be able to silently lurk on the network, but will be regularly forced to act against the system increasing the chances of detection.

As a further defense, machines may be altered as part of the restart process to run on a different set of software components (e.g., operating system, middleware, etc.), randomness can be introduced, or perhaps changes can even be applied to various hardware components—further denying the attacker opportunities to establish a permanent foothold. Diversity across time also encompasses the proactive defense of cryptographic assets over time, such as the systematic and continuous regeneration or redistribution of key materials, etc., as further described below.

It is undesirable for an attacker to control any number of systems even if this number is lower than the critical threshold. But, because perfect computer security is impossible (i.e., the number of vulnerabilities, intrusions, or errors is never zero), a more practical goal is to configure a communication network or system to be resilient to some amount of compromise long enough for system operators to detect and remediate. Diversity across space and time is designed to slow down an intruder and force them to cross a more diverse range of intrusion detection mechanisms or functions (e.g., "tripwires") to increase the likelihood of detection and remediation before the safety and/or liveness of the overall system is compromised.

Threshold Cryptography

The third high-level component of various embodiments is proactive threshold cryptography. This encompasses a suite of cryptographic techniques and protocols (e.g., those pioneered by the CALYPSO project) to "enhance permissioned and permissionless blockchains with the ability to manage confidential data without forfeiting availability or decentralization". Various embodiments leverage such techniques as components within a framework designed to facilitate secure multiparty encryption/decryption of confidential data, as well as fully decentralized orchestration of threshold key lifecycle operations. This paradigm allows cryptographic functions to operate using secret key materials that are distributed across the participating nodes of the system, using a configurable recovery threshold. Any number of "partial" secret materials below the recovery threshold reveals no information about the corresponding secret. By defining this threshold to align with the fault tolerance threshold of the underlying BFT SMR protocol, various embodiments may extend the system's defenses to additionally secure relevant stored data.

Figure 3:
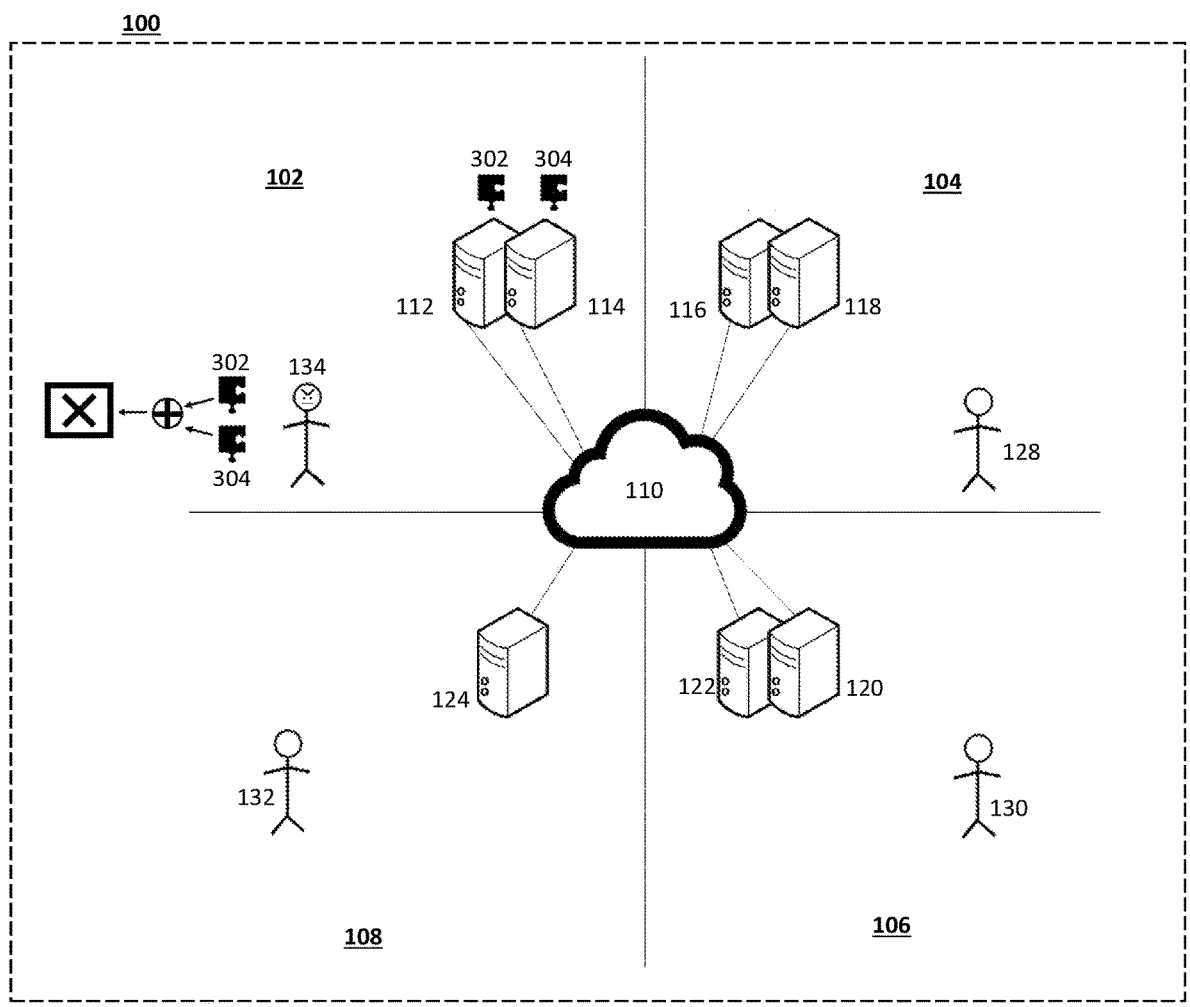
FIG. 3 is a system diagram illustrating a potential attack scenario within an example deployment of a system according to various embodiments.

FIG. 3 is a system diagram illustrating a potential attack scenario within an example deployment of the system 100 according to various embodiments. With reference to FIGS. 1-3, FIG. 3 illustrates a scenario in which a malicious administrator 134 abuses her privileged user access of trust zone 102 in order to maliciously exploit nodes 112 and 114. In doing so, the malicious administrator 134 is able to force nodes 112 and 114 to each generate partial decryption shares 302 and 304 respectively. However, without access to any of the other nodes (116, 118, 120, 122, and 124), a malicious administrator 134 is unable to obtain enough decryption shares to satisfy the decryption threshold. Thus, attempting to recombine shares 302 and 304 reveals no information about the collective secret key or any information encrypted for the nodes in the communication network (e.g., Threshold Diffie-Hellman (TDH) ciphertexts).

These defenses can be extended by proactively redistributing threshold secret key materials on a periodic basis, thereby further limiting the use of partial secret materials to bounded windows of time. Some embodiments extend established methods for implementing these defenses by orchestrating threshold key lifecycle management operations via a fully decentralized, deterministic "Blockchain Epoch" protocol. This allows critical threshold key management, membership, etc. operations required to execute on a periodic basis to do so in a completely deterministic manner (i.e., without requiring non-deterministic mechanisms such as timeouts, external services, clients, etc.).

Some of the cryptographic techniques leveraged may include: (1) Distributed Key Generation (DKG), (2) verifiable threshold encryption/decryption (e.g., TDH), and (3) verifiable secret redistribution (VSR).

DKG is a class of distributed protocols for securely generating a collective public/private key pair among a group of potentially untrustworthy participants. In some embodiments, DKG may be executed during Epoch 1 when nodes in the communication network are initialized and the required minimum number of nodes have joined. The outcome of the protocol is a public encryption key (which is published to the DL) and a partial secret decryption key (sometimes referred to herein as a "key share") for each node that participated. These partial keys are each "M-of-N" secret shares (such as, Shamir shares) corresponding to a logical decryption key with a recovery threshold set to correspond to the BFT threshold of the system. However, this logical decryption key is never assembled at any point by the system. Rather, each partial decryption key is only stored in memory by the node that owns that partial key and is never disclosed or stored to persistent storage by any correct (non-malicious) node. An adversary who gains control of a node with a partial key could gain access to that key; however, any number of partial keys less than the decryption threshold provably reveals no information about the collective secret. Thus, an adversary who compromises any number of nodes below this threshold will still gain no advantage towards accessing any sensitive data encrypted under the public encryption key.

Once DKG has been completed, the nodes that participated in the protocol represent a "replica set," wherein each replica is a registered node that possesses a valid partial decryption key. As long as their partial decryption keys are valid, these replicas will be able to act as partial decryption servers.

TDH (Threshold Diffie-Hellman) is an example threshold cryptosystem designed to provide provable security against adaptive chosen ciphertext attacks. It provides protocols for encrypting messages using a public key (in this case, generated by DKG), securely generating decryption shares from valid ciphertexts using partial decryption keys, publicly verifying decryption shares, and combining a threshold number of valid decryption shares to recover decrypted plaintexts. In some embodiments, the system may execute TDH operations using the DL in order to perform operations that are auditable, verifiable, and secure.

In some embodiments, the API for threshold encryption/decryption is similar to encryption/decryption in most conventional (non-distributed) asymmetric cryptosystems. A client simply needs to gain access to the public key and then generate a ciphertext for their message using the public key. In some embodiments, the public key is stored publicly on the DL (once DKG has completed), so any client can request it from the DL (using the API for storage retrieval), verify it, and encrypt messages. Each generated ciphertext may include an embedded label specifying access control policies (stored on the DL) to be applied to the encrypted message, as well as a cryptographic proof guaranteeing that the ciphertext is correctly formed. These ciphertexts may then be submitted to a replica, publicly validated, and securely published via the DL.

Decryption in an embodiment system (using, for example, TDH) requires obtaining decryption shares from a defined threshold number of nodes. Within an embodiment system, this decryption threshold may be set to align with the BFT threshold of the system, so an adversary cannot perform unauthorized decryptions without defeating BFT for the entire system. Clients can request partial decryption shares for a given ciphertext from a threshold number of replicas (i.e., nodes with valid partial decryption keys (e.g., key shares)). Each replica may evaluate whether the requesting client is entitled to access the encrypted message by checking the access policy label embedded in the ciphertext against the access policy data stored on the DL. If the client has the required permissions, the replica will respond with a partial decryption share for the ciphertext. Each decryption share may include a publicly verifiable proof that the client can use to validate that it is correctly formed. Once the client receives a threshold number of correct shares, these correct shares can be combined to recover the original message.

Combining DKG with a threshold asymmetric encryption scheme enables a system for storing and manipulating sensitive information on the DL while maintaining confidentiality and integrity of protected data against potentially malicious peers with a recovery threshold set to correspond with that of the underlying BFT SMR protocol. This effectively extends the defenses of the overall system to include these data protection guarantees which allow the some embodiments to additionally act as a decentralized escrow service.

However, there are two limitations to this approach by itself. The first is that a mobile adversary could undermine these protections by exfiltrating the partial decryption key of each compromised replica to an external medium that is not subject to proactive recovery, thus allowing the adversary to decrypt messages intended for that node even after it is no longer compromised. The second limitation is that most practical systems will require some protocol for executing membership changes over time: e.g. adding new nodes, decommissioning old nodes, etc. Most practical BFT SMR frameworks support this type of functionality for nodes participating in consensus, but lack built-in mechanisms for recomputing partial decryption keys for the new set of nodes. Without such a protocol for updating the original set of partial decryption keys (e.g. those generated by the replicas that participated in DKG), any newly added nodes will not be able to participate as partial decryption servers, and the active replica set of decryption servers will gradually degrade if older nodes age into decommission. If the number of correct replicas capable of performing decryption falls below the recovery threshold, encryption and decryption operations can no longer be performed.

VSR addresses both of these limitations by providing a decentralized protocol for periodically re-generating (or "redistributing") a new set of partial decryption keys. It generally does this by leveraging the homomorphic properties of polynomial secret sharing in order to securely and verifiably generate a new, random sharing without modifying or reconstructing the underlying secret. This means that, upon completion of VSR, each participating node will possess a new partial decryption key capable of generating decryption shares without changing the collective secret (which would necessitate re-encrypting all existing ciphertexts). However, because the set of partial keys output from VSR represent a new sharing, decryption shares generated cannot be combined with those from any other (e.g., previous) replica sets to produce decryptions. Thus, once VSR has completed and all correct replicas have deterministically transitioned to using the new key set (which includes securely deleting their previous partial keys from memory), any remaining partial decryption keys from the previous set become unusable for decryption since a threshold number no longer exists.

By proactively performing VSR on a periodic basis to continuously generate new partial decryption key sets, the validity period during which any given set of partial keys can be used for decryption is limited. A mobile adversary could still gain access to partial decryption keys by exfiltrating them from the compromised replicas before proactive recovery occurs; however, without a threshold number, these exfiltrated partial keys will become inoperable once the next replica set becomes active, since the remainder of keys for the previous set will have been replaced and deleted by all correct replicas.

Another feature of VSR is the ability to account for membership changes to the active replica set. Newly added nodes simply wait until the beginning of the next epoch for the VSR protocol to begin, register a one-time public key, and participate in the protocol. This ensures that newly registered nodes receive a partial decryption key—allowing them to participate as decryption servers—and inactive/decommissioned nodes do not. Various embodiments further extend these protections by orchestrating VSR transitions (along with other threshold key management operations) using the DL without involvement from an external service or client (see "Blockchain Epochs" below).

A Combined System

Figure 4:
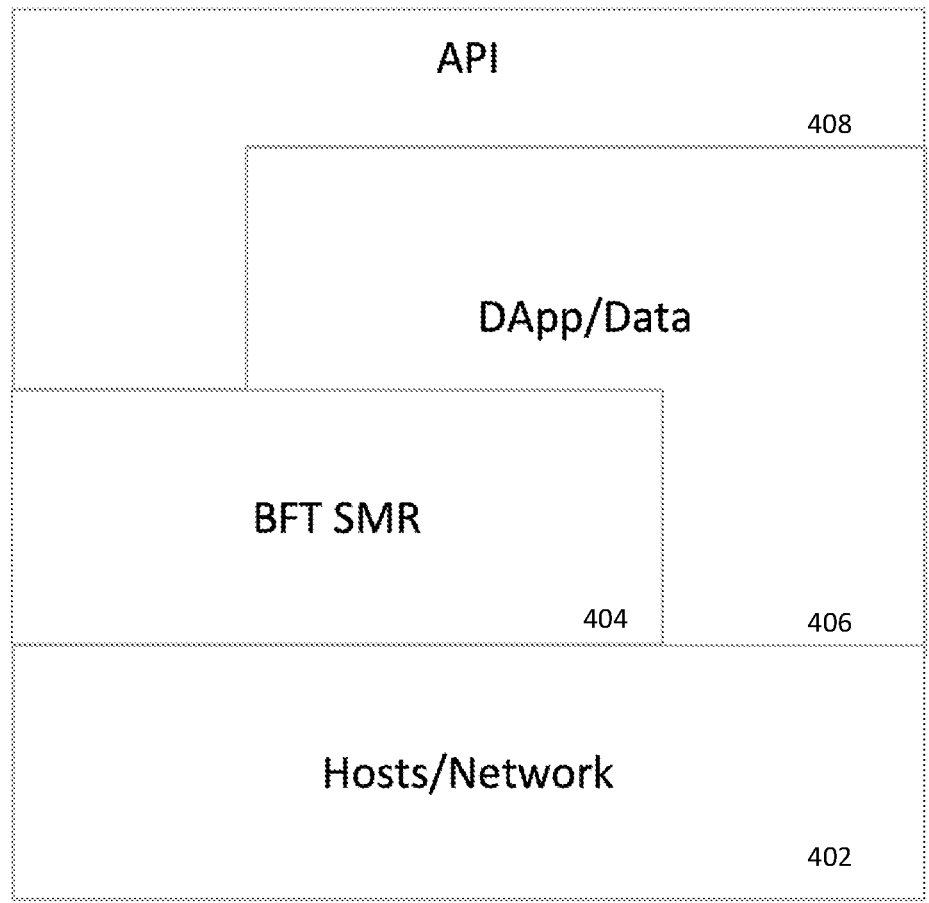
FIG. 4 is a conceptual diagram illustrating conceptual layers of an example system according to various embodiments.

FIG. 4 is a conceptual diagram illustrating conceptual layers 400 of an example system according to various embodiments. With reference to FIGS. 1-4, a "Host/Network" layer 402 represents the physical and/or logical information systems performing execution. This could include (but is not limited to) physical and/or virtual computers/servers, data storage media, networking/IO resources, hardware security modules (HSMs), Trusted Platform Modules (TPMs), other trusted hardware resources, OSs, boot/startup media, Public Key Infrastructure (PKI), other cryptographic/security infrastructure, hypervisors, virtualization infrastructure, system administration/orchestration tools, resource management systems, physical security barriers/mechanisms, organizational/policy controls, etc. At this layer (402), embodiment systems may implement defenses such as federated trust zones (such as FIG. 1), diversity over space for host components (such as FIG. 2), and others.

Directly above this is a "BFT SMR" layer 404. This includes (at least) an implementation of the BFT SMR protocol utilized by the particular embodiment system, as well as functionality required for configuration, administration, debugging, etc. As described above, this layer is responsible for implementing BFT consensus and state replication. It can also be leveraged as a secure broadcast medium for communications between nodes. The nodes, themselves, may submit messages as updates to the BFT layer which, in turn, will securely replicate these messages across all correct nodes in the system. These messages may be public to all participants in the system or (via encryption) private to specific nodes/replicas/principals/etc.

A DApp (Decentralized Application)/Data layer 406 operates on top of both the "Host/Network" (402) and "BFT SMR" (404) layers. This layer may implement decentralized application logic for all correct nodes, such as data management, access control, other state transition logic, etc. Importantly, it also may implement the Blockchain Epoch protocol, to manage threshold key lifecycle operations, membership transitions, secret/ephemeral state transitions, etc. While it primarily operates by manipulating and executing the replicated updates received from the "BFT SMR" layer 404, various embodiments may also leverage the "Host/Network" layer 402 for cryptographic resources (such as PKI, HSMs/TPMs), etc. Though the majority of examples in this specification posit layer 404 and layer 406 principals co-locally as unified nodes (this somewhat simplifies certain security properties and protocol interactions), various embodiments may deploy layer 404 and layer 406 principals to separate hosts, physical/virtual servers, etc.

An Application Programming Interface (API) layer 408 operates on top of the DApp/Data 406 and BFT SMR layer 404. This layer implements functionality enabling client interactions with the system. This layer includes (but is not limited to) features designed to run directly on client devices, allowing them to interface with the DApp/Data layer 406 and/or BFT SMR layer 404. It also includes logic within components of the DApp/Data layer 406 and/or BFT SMR layer 404 for handling client initiated interactions. Various embodiments may implement layer 408 communications via numerous possible methods, e.g. by issuing requests to layer 406 nodes directly via a defined API, by communicating via BFT SMR layer 404 as a BFT SMR client, etc. Various embodiments may also/alternatively elect to implement API features via one or more possible intermediate/"gateway" services. This may be desirable, for example, in environments wherein API access to servers hosting certain classes of data must be restricted.

Figure 5:
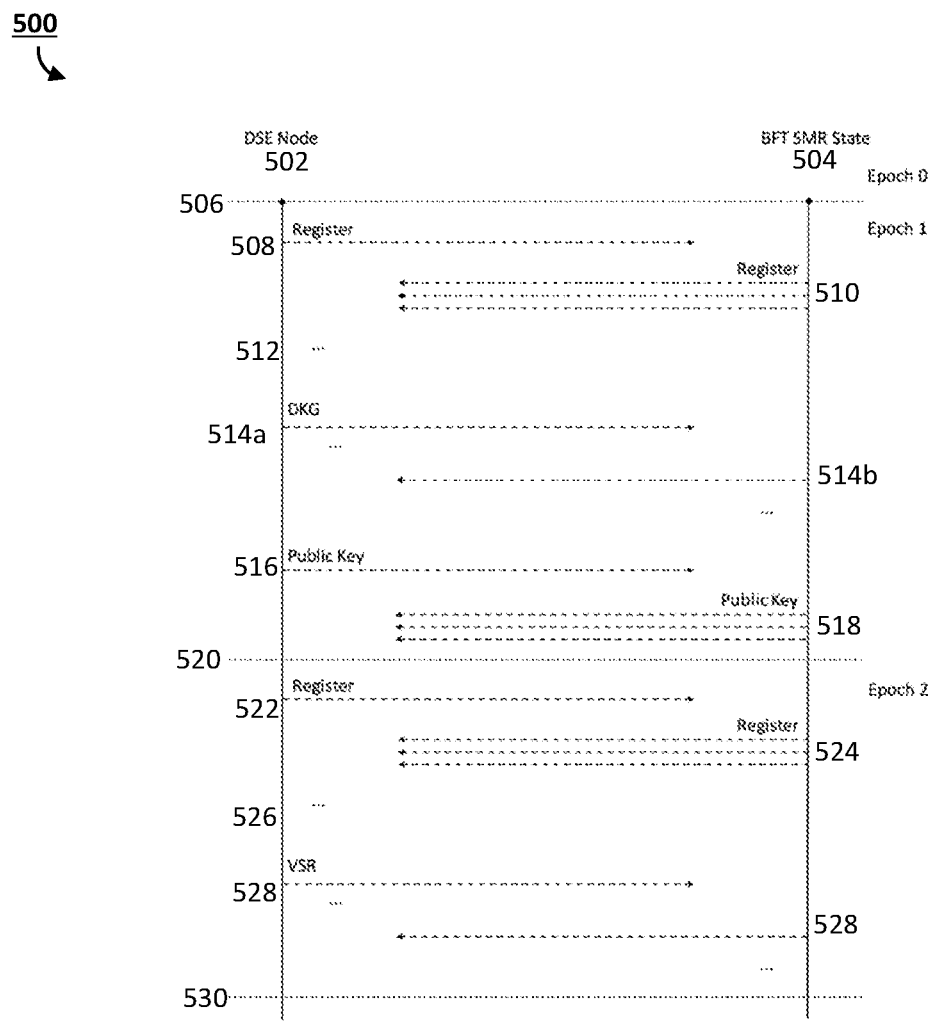
FIG. 5 is a data flow diagram illustrating message flows for select proactive threshold key management operations operating within the Blockchain Epochs protocol according to various embodiments.

FIG. 5 is a data flow diagram illustrating message flows 500 for select proactive threshold key management operations operating within the Blockchain Epochs protocol according to various embodiments. With reference to FIGS. 1-5, DSE Node 502 represents the state of a single node over time. BFT SMR State 504 represents decentralized application state established by the BFT SMR layer (sometimes referred to as the DL) over time.

State transition 506 represents a state transition from Epoch 0 to Epoch 1. State transition 506 may occur upon startup, once enough nodes are available for BFT SMR to begin. Once Epoch 1 has started, node 502 may submit a "Register" message 508 as a BFT SMR update which may be processed and delivered to all other correct nodes via 504. Message 508 indicates that node 502 has generated requisite secret/ephemeral state (e.g. a temporary private key), published requisite public state (e.g. a temporary public key, included in the contents of message 508), and thus is ready to participate in distributed key generation (DKG). Concurrently, all (or substantially all) other correct nodes in the system may perform these functions, resulting in "Register" messages 510 being submitted to BFT SMR by respective other nodes and, subsequently, received by node 502. Upon receiving each message in 510, node 502 may process each update and gradually construct a "replica set" for the current Epoch (e.g., Epoch 1). After a defined threshold 512 has been reached, the replica set may be locked (i.e., will not be modified by subsequent "Register" messages) and DKG will begin. Various embodiments may define threshold 512 according to various deterministic factors. For example, the threshold 512 may represent a minimum number of peers (nodes) required to execute DKG (for which the system may wait, in some embodiments). However, various embodiments may employ other factors, such as Epoch-relative thresholds (e.g. based on block-height, execution round, etc.), to delay the start of DKG for security/performance/etc. reasons.

Once DKG has begun, node 502 may begin sending DKG messages 514a and receiving DKG messages 514b via BFT SMR 504. The number of these messages, their contents, the number of message rounds, etc. may vary depending on the specific DKG protocol employed. However, upon completion of DKG, each correct node that participated will possess a partial secret key as well as the additional information required to compute the shared public key. Once node 502 has computed the public key, it will submit message 516 to BFT SMR 504 to be broadcast to other nodes. Concurrently, all other correct nodes will likewise publish their public key values the BFT SMR 504, which will be received by node 502 as messages 518. Once a requisite number of matching public key values have been published to BFT SMR state 504, the public key will be considered committed and ready for use upon the start of Epoch 2 (after transition 520).

Transition 520 may occur once the final execution unit of Epoch 1 completes (see "Blockchain Epochs" below for a deeper explanation of the Epoch protocol). At this point, the partial secret keys generated by DKG during Epoch 1 may become "active" and the replicas holding those partial keys may begin servicing decryption requests from the API layer 408. Once Epoch 2 has started, the registration phase may proceed similarly to that of Epoch 1 as described. In some embodiments, a new replica state (e.g. temporary public and private keys) may be generated for this Epoch by each node and used to populate "Register" messages 522 and 524 respectively. This may be done for every Epoch, such that a replica state (such as temporary public and private keys) are not reused in separate Epochs. After a defined threshold 526 has been reached, the replica set will be locked and verifiable secret redistribution (VSR) may begin. Threshold 526 may be similar to threshold 512; however, various embodiments may utilize different factors to define the threshold 526 since VSR may be executed on an ongoing basis. In some embodiments, once VSR has begun, node 502 may begin sending and receiving VSR messages 528 via BFT SMR 504. The number of these messages, their contents, the number of message rounds, etc. may vary depending on the specific VSR protocol employed. However, in various embodiments, upon completion of VSR, each correct node that participated will possess a new partial secret key.

Transition 530 may occur once the final execution unit of Epoch 2 completes. At this point, the partial secret keys generated during Epoch 1 become invalid, secret/ephemeral state from Epoch 1 is evicted, partial secret keys generated during Epoch 2 become active, and a new VSR phase may begin with the start of the next Epoch (e.g., Epoch 3). In various embodiments, the partial secret keys generated during Epoch 2 may be used to service decryption requests during Epoch 3.

Figure 6:
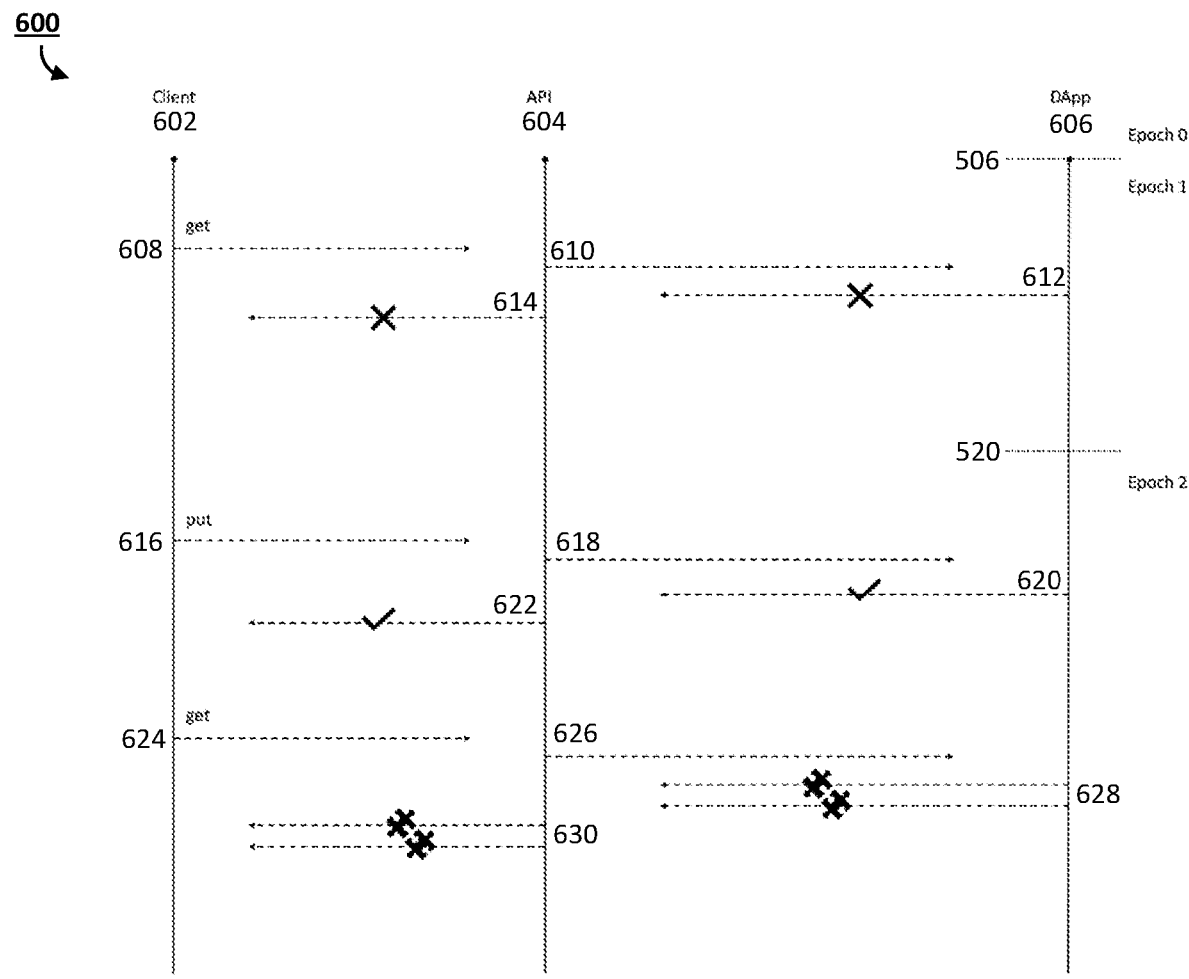
FIG. 6 is a data flow diagram illustrating message flows for API operations operating within the Blockchain Epochs protocol according to various embodiments.

FIG. 6 is a data flow diagram illustrating message flows 600 for API operations for an example embodiment system. With reference to FIGS. 1-6, client 602 represents a client's view of communications over time. API 604 represents a view of communications over time for an API layer (e.g., 408). DApp 606 represents a view of communications over time for the DApp/Data layer (e.g., 406), and may include Epoch transitions 506 and 520 for reference. Client 602 may send a "get" request 608 to API 604 requesting partial decryption shares for a ciphertext. API 604 may then issue request 610 to DApp/Data layer 606. However, because DKG has not been completed (e.g., no nodes will be available for decryption until Epoch 2; also, a valid ciphertext must exist before decryption shares can be generated), request 610 results in failure 612, which the API 604 reports to the client 602 as response 614.

Subsequently, client 602 may send a "put" request 616 to the API 604, attempting to publish a ciphertext. API 604 may then issue a request 618 to DApp/Data layer 606, which may succeed, resulting in success message 620. API 604 may then notify the 602 client of the success with response 622.

Client 602 may later attempt to recover decryption shares for the encrypted message included in request 616 by sending "get" request 624 to the API 604. API 604 may issue request 626 to the DApp/Data layer 606, which may succeed, in response to which the DApp/Data layer 606 may return at least a threshold number of decryption share responses 628. API 604 may return responses 630 that include the decryption shares to the client 602. Client 602 may then decrypt and recombine the decryption shares to recover the original message.

Figure 7:
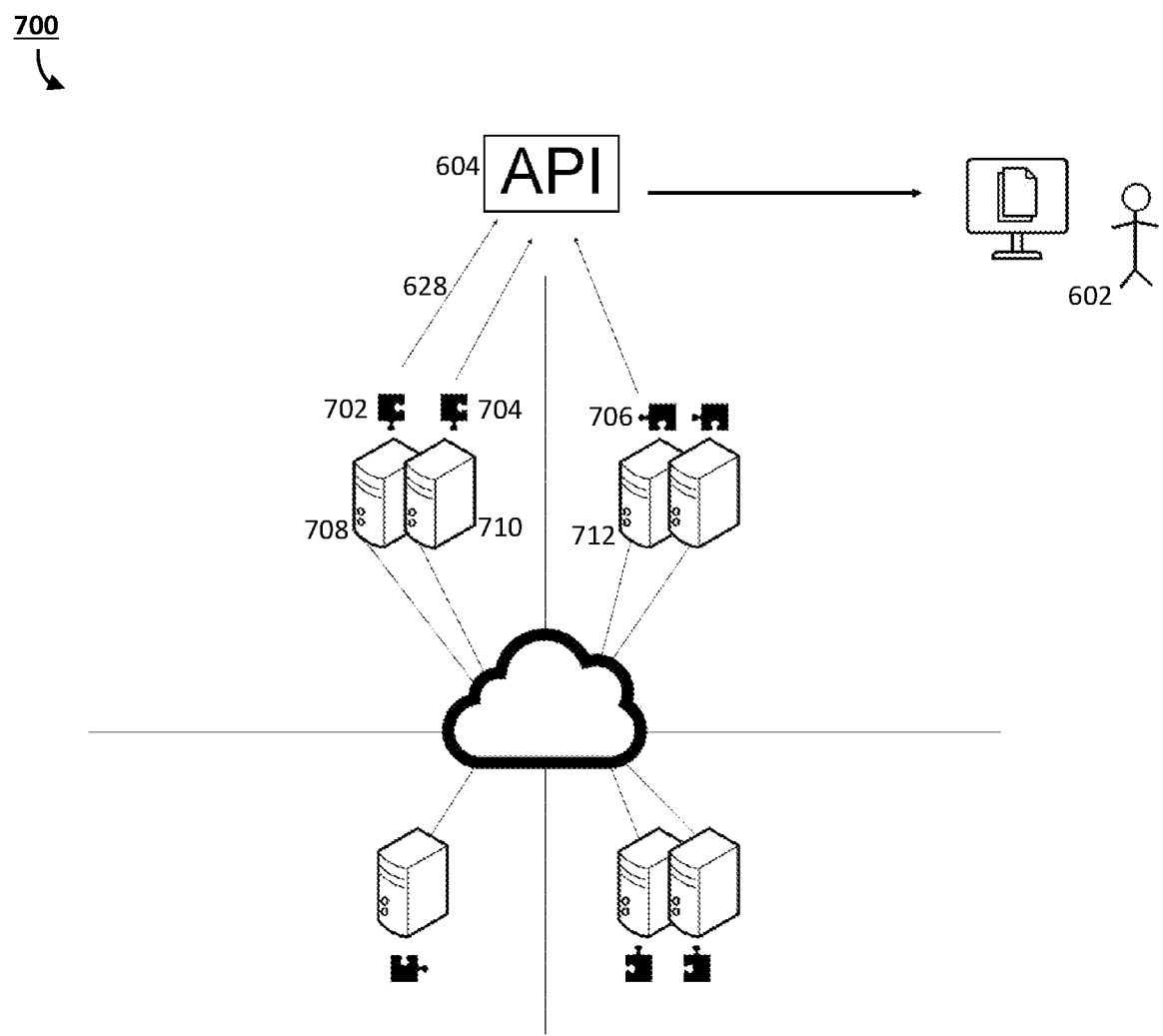
FIG. 7 is a system diagram illustrating API message flows within an example deployment of a system according to various embodiments.

FIG. 7 is a system diagram 700 illustrating decryption share responses 628 being received by API 604 and returned to client 602. With reference to FIGS. 1-7, the API 604 may receive partial decryption shares 702, 704, and 706 from nodes 708, 710, and 712 respectively, and return the partial decryption shares 702, 704, and 706 to client 602. In various embodiments, the API 604 may return more partial decryption shares if they are available; however, only a threshold number of valid partial decryption shares are required. The API 604 may receive these shares in a variety of possible ways, including communicating with each node directly or via the BFT SMR layer 404.

Blockchain Epochs

As noted above, some embodiments may utilize a Blockchain Epoch protocol to orchestrate threshold key lifecycle management operations for the system. Various embodiments may enable computing devices to execute the initial DKG and ongoing VSR protocols over time in a deterministic manner without involvement from an external service or client. In some embodiments, the Epoch protocol may partition the decentralized state over time based on the execution of the underlying consensus layer (e.g., consensus operations). In BFT SMR systems that employ a "blockchain" paradigm, this state execution may be marked by "block height." In some embodiments, execution units may also be defined based on the execution of updates, protocol rounds, or other criteria. While many established Blockchain frameworks enable using "block height" specifically as an input to decentralized application logic, the present invention exploits the unique security and performance properties of BFT consensus protocols with strong safety and liveness guarantees (commonly utilized by closed/permissioned DL systems) to construct a discrete, pseudo-temporal basis for deterministically implementing decentralized functions with certain weak timing requirements. Therein, the decentralized state can be further partitioned into "Epochs," which various embodiments use to deterministically orchestrate periodic processes such as threshold key lifecycle operations, membership/view changes, etc. The consensus properties that make this possible are (at least) strict guarantees of safety and liveness. These are often baseline requirements for BFT SMR protocols designed to operate in closed environments with known peers.

The Blockchain Epoch protocol leverages strict safety in order to ensure consistency and finality of execution. This allows nodes to reliably evict ephemeral and/or secret state at the end of each Epoch (such as that which is required by VSR). By comparison, BFT SMR protocols without strict safety (such as those based on proof-of-work, commonly used within many permissionless DL systems) are unable to guarantee finality and, thus, require extrinsic mechanisms to estimate commitment based on probability, network synchrony, and many other possible factors—which ultimately make deterministic, pseudo-temporal state transitions untenable.

Strict liveness guarantees that decentralized state execution is explicitly bound to protocol execution over time—ensuring that execution is intrinsically temporal, rather than probabilistic (as in proof-of-work based systems). BFT SMR protocols with liveness guarantees (such as bounded-delay) can further bound temporal variance by coupling execution latency to network stability (which is generally manageable in closed settings).

Figure 8:
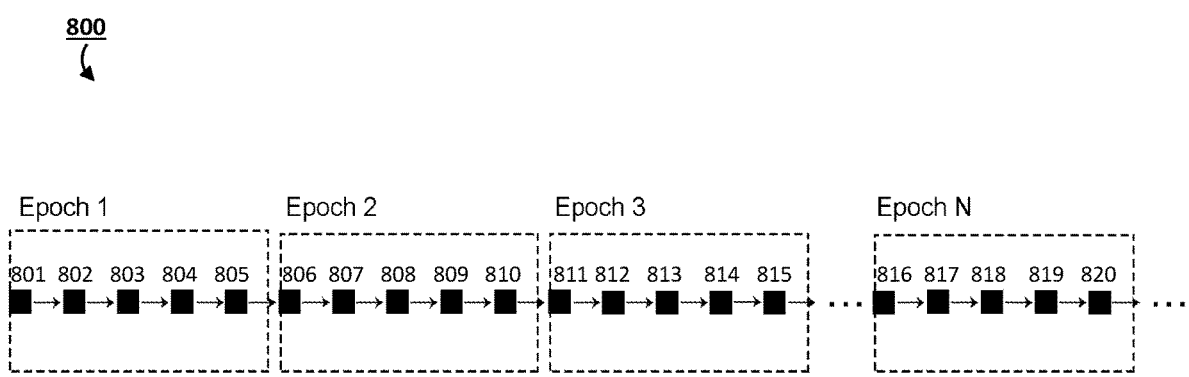
FIG. 8 is a system state diagram illustrating Epoch phases within the BFT SMR state of an example deployment of a system according to various embodiments.

FIG. 8 is a system state diagram illustrating Epoch phases 800 within a BFT SMR state of an example deployment of a system according to various embodiments. Referring to FIGS. 1-8, in some embodiments, a Blockchain Epoch protocol may deterministically partition a decentralized system state. Updates or batches 801 through 820 are successive updates, or batches of updates, (e.g. a "Blockchain") committed by the BFT SMR system, which may be grouped into logical Epochs (e.g., Epochs 1, 2, 3, ... N). The size of each Epoch may be set to a fixed value or may be variable based on numerous deterministic factors.

Figure 9:
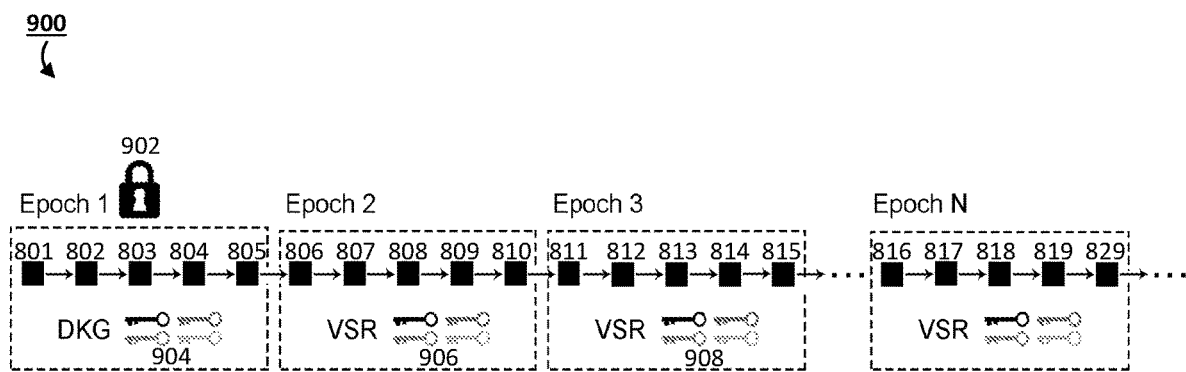
FIG. 9 is a system state diagram illustrating state for threshold key management operations for Epoch phases within the BFT SMR state according to various embodiments.

FIG. 9 is a system state diagram illustrating states 900 for threshold key management operations for Epoch phases within the BFT SMR state according to various embodiments. With reference to FIGS. 1-9, FIG. 9 illustrates threshold key management phases within the DL state of each of Epochs 1, 2, 3 ... N. Each Epoch 1, 2, 3 ... N may include both a public (decentralized; published by BFT SMR) and a secret (known and stored only by individual nodes) state for its respective period, beginning with a DKG phase in Epoch 1, and followed by a VSR phase during each successive Epoch 2, 3 ... N. Public key 902 is a system public key generated by DKG during Epoch 1. Public key 902 may be stored publicly and permanently by BFT SMR. During Epoch 1 DKG, various nodes may execute (perform) DKG operations to produce partial decryption key set 904. In various embodiments, each node that generates a partial decryption key for set 904 keeps its generated partial decryption key secret, and does not reveal its generated partial decryption key to other nodes. During Epoch 2, the partial decryption keys 904 will become active and various nodes may execute (perform) VSR operations, producing partial decryption key set 906.

At the beginning of Epoch 3, the partial decryption key set 906 becomes active and various nodes may execute (perform) VSR operations to produce partial decryption key set 908. In various embodiments, when the partial decryption key set 906 becomes active, nodes may evict from memory the partial decryption keys 904. In various embodiments, at most only two sets of partial decryption keys may exist at any one time: the currently active set and (potentially, if VSR has completed) the newly generated set that will become active at the start of the next Epoch.

Comprehensive Diversity Over Time

Various embodiments of the present invention may utilize a comprehensive diversity over time approach to protect both the underlying nodes comprising the system as well as the data stored therein. This is accomplished by leveraging an Epoch-based proactive threshold key management lifecycle alongside established techniques for defense across time, to provide more sophisticated mechanisms for initiating proactive recovery as described herein. Whereas established proactive recovery mechanisms are strictly time based and seek to be as physically and/or logically isolated as possible (to reduce their potential attack surface), proactive recovery mechanisms employed by various embodiments may have the ability to receive external signals in order to maintain synchrony with the Epoch protocol. This could be used to mitigate possible drift between Epoch and proactive recovery periods over time.

Example Implementations

Figure 10:
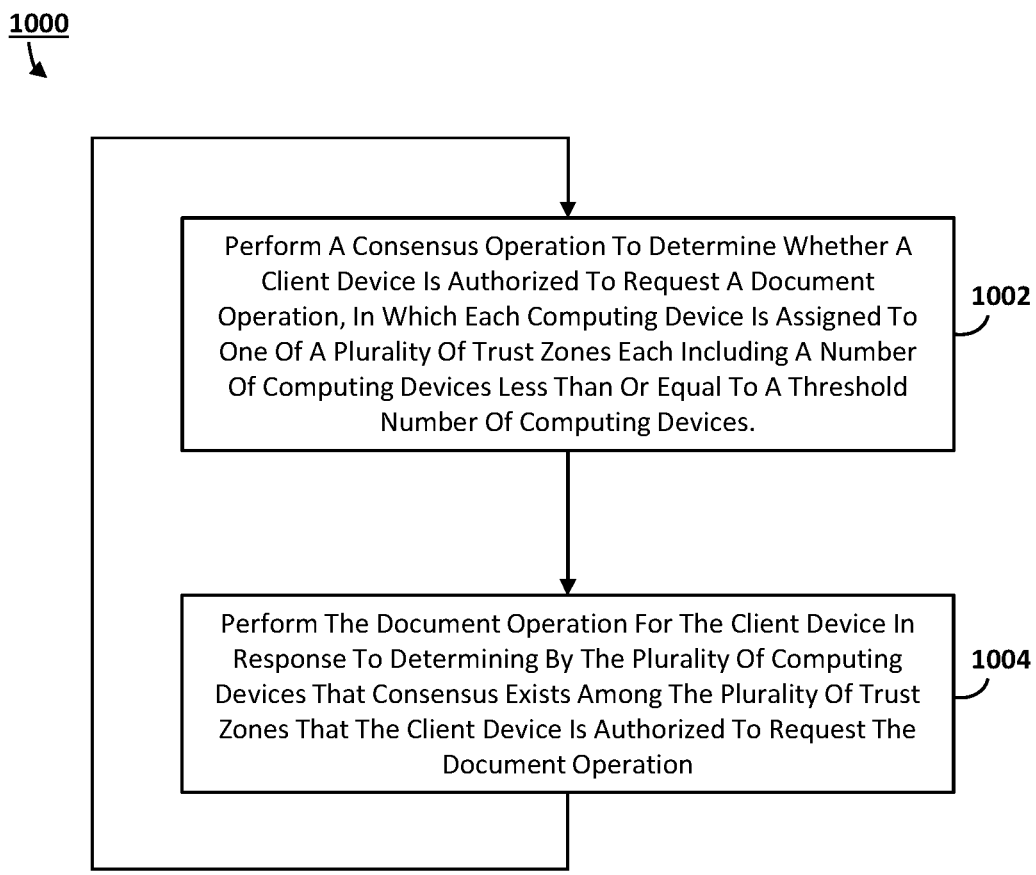
FIG. 10 is a process flow diagram illustrating a method that may be performed by a processor of each of a plurality of computing devices for providing information security services for a communication network according to various embodiments.

FIG. 10 is a process flow diagram illustrating a method 1000 that may be performed by a processor of each of a plurality of computing devices for providing information security services for a communication network according to various embodiments. With reference to FIGS. 1-10, the method 1000 may be implemented by a processor (e.g., 1301, FIG. 13) of a computing device (node) (e.g., 112, 114, 116, 118, 120, 122, 124, 502, 708, 710, 712).

In block 1002, the plurality of computing devices may perform a consensus operation to determine whether a client device is authorized to request a document operation. In some embodiments, each computing may be is assigned to one of a plurality of trust zones (e.g., 102, 104, 106, 108) each including a number of computing devices less than or equal to a threshold number of computing devices.

In some embodiments, the document operation may include storing information in the communication network, retrieving information from the communication network, entering information into the communication network for encryption, or obtaining information from the communication network for decryption. In some embodiments, the plurality of computing devices may perform the consensus operation to determine whether the client device is authorized to request a document operation in response to receiving a request from a client device for a document operation to be performed by the communication network. In some embodiments, the plurality of computing devices may generate an access policy by the consensus operation indicating whether the client device is authorized to request a document operation, and may apply the access policy to a request from the client device to perform the document operation. In some embodiments, the plurality of computing devices may be configured to perform the consensus operation using one or more of different operating systems, different applications, or different versions of application software.

In some embodiments, the plurality of computing devices may perform the consensus operation to determine whether a client device is authorized to request partial decryption shares for encrypted information stored in the communication network. In some embodiments, the plurality of computing devices may send to the client device the partial decryption shares to determining by the plurality of computing devices that the client device is authorized to request the partial decryption shares for encrypted information stored in the communication network.

In block 1004, the plurality of computing devices may perform the document operation for the client device in response to determining by the plurality of computing devices that consensus exists among the plurality of trust zones that the client device is authorized to request the document operation.

The plurality of computing device may perform the operations of blocks 1002 and 1004 from time to time.

Figure 11:
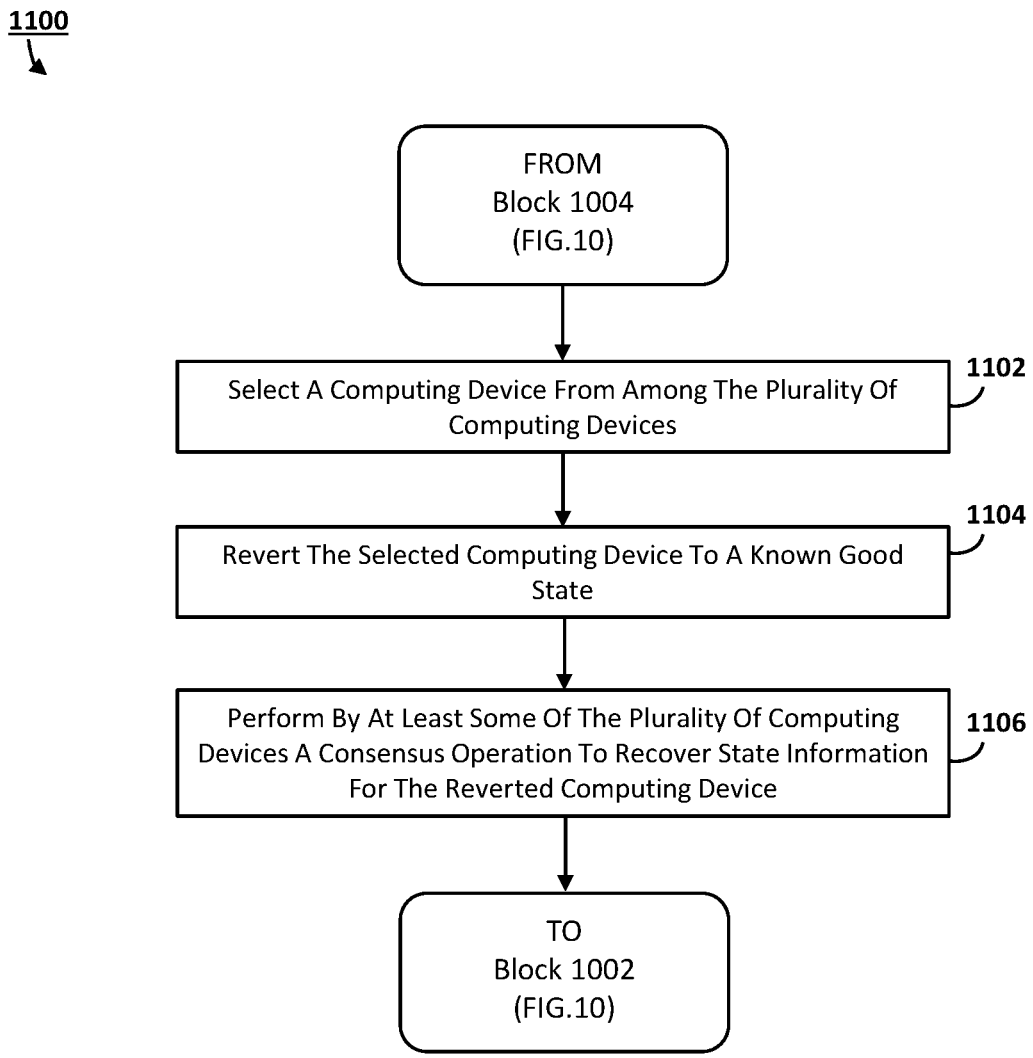
FIG. 11 is a process flow diagram illustrating operations that may be performed by a processor of each of a plurality of computing devices as part of the method for providing information security services for a communication network according to various embodiments.

FIG. 11 is a process flow diagram illustrating operations 1100 that may be performed by a processor of each of a plurality of computing devices as part of the method 1000 for providing information security services for a communication network according to various embodiments. With reference to FIGS. 1-11, the operations 1100 may be implemented by a processor (e.g., 1301, FIG. 13) of a computing device (node) (e.g., 112, 114, 116, 118, 120, 122, 124, 502, 708, 710, 712).

In some embodiments, after performing the operations of block 1004 as described, the plurality of computing devices may select a computing device from among the plurality of computing devices in block 1102.

In block 1104, the plurality of computing devices may perform operations to revert the selected computing device to a known good state.

In block 1106, at least some of the plurality of computing devices may perform a consensus operation to recover state information for the reverted computing device. In some embodiments, at least some of the plurality of computing devices may perform the consensus operation to validate recovered state information for the reverted computing device.

The plurality of computing devices may perform the operations of block 1002 (FIG. 10) as described.

Figure 12:
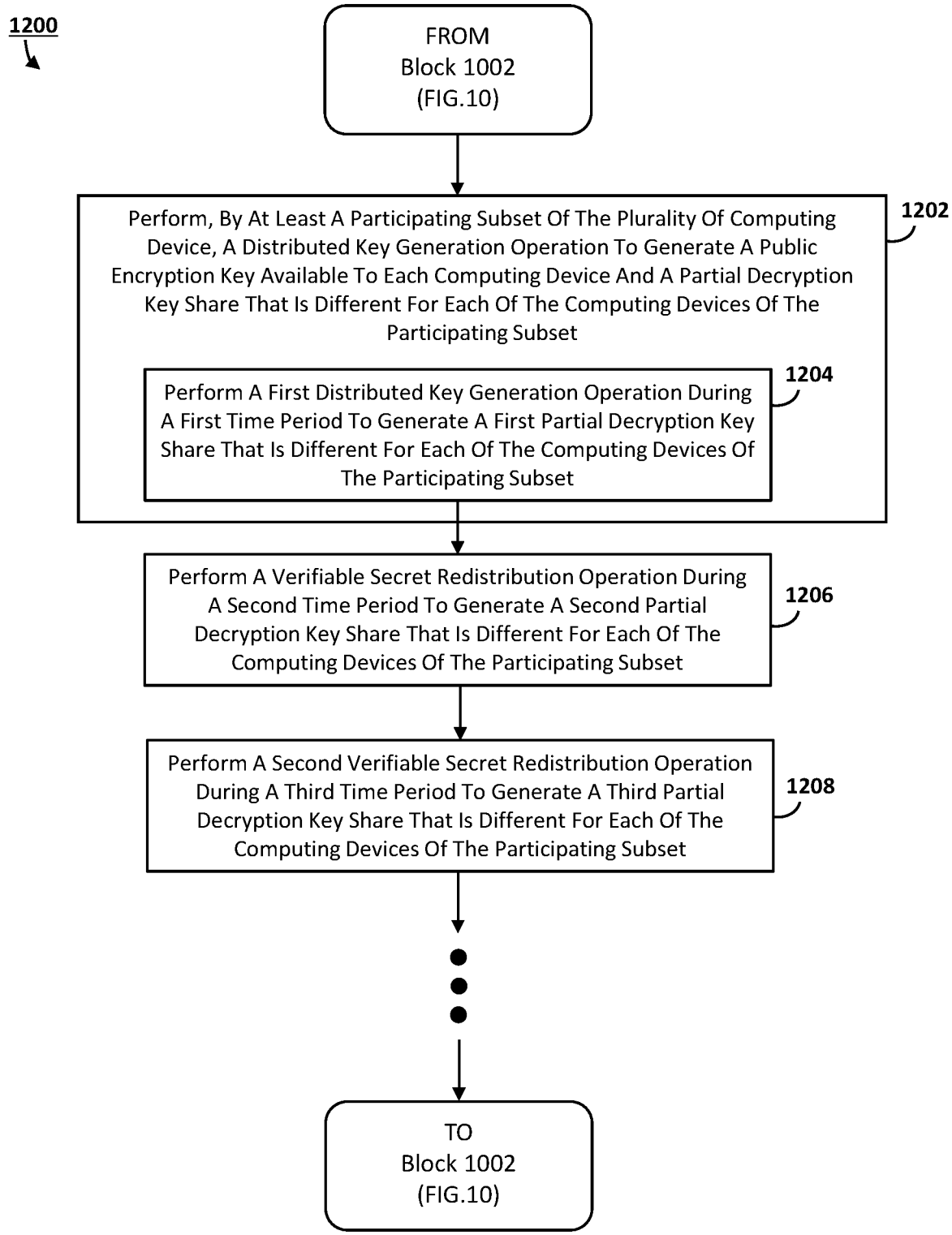
FIG. 12 is a process flow diagram illustrating operations that may be performed by a processor of each of a plurality of computing devices as part of the method for providing information security services for a communication network according to various embodiments.

FIG. 12 is a process flow diagram illustrating operations 1200 that may be performed by a processor of each of a plurality of computing devices as part of the method 1000 for providing information security services for a communication network according to various embodiments. With reference to FIGS. 1-12, the operations 1200 may be implemented by a processor (e.g., 1301, FIG. 13) of a computing device (node) (e.g., 112, 114, 116, 118, 120, 122, 124, 502, 708, 710, 712).

In some embodiments, after performing the operations of block 1004 as described, at least a participating subset of the plurality of computing devices may perform a distributed key generation operation to generate a public encryption key available to each computing device and a partial decryption key share that is different for each of the computing devices of the participating subset in block 1202.

In some embodiments, as part of the operations of block 1202, at least the participating subset of the plurality of computing devices may perform a first distributed key generation operation during a first time period to generate a first partial decryption key share that is different for each of the computing devices of the participating subset in block 1204.

In block 1206, at least the participating subset of the plurality of computing devices may perform a second distributed key generation operation during a second time period to generate a second partial decryption key share that is different for each of the computing devices of the participating subset.

In some embodiments, the first time period and the second time period may be defined by the performance of the consensus operation by the plurality of computing devices. In some embodiments, the first time period and the second time period may each be a Blockchain Epoch.

In block 1208, at least the participating subset of the plurality of computing devices may perform a third distributed key generation operation during a third time period to generate a third partial decryption key share that is different for each of the computing devices of the participating subset.

The plurality of computing devices may perform the operations of block 1002 (FIG. 10) as described.

Various embodiments may be implemented in a number of examples.

With reference to FIGS. 1-12, as a decentralized system of record, an embodiment system can provide "ground-truth" services used to bootstrap additional security guarantees for the wider network. These may include potential functions such as IdAM, configuration/policy management, etc. For these use cases, the embodiment system acts as an authoritative decentralized database maintaining sensitive (but non-confidential) information related to user/role-based access control privileges, application/network/etc. configuration data, public key infrastructure (PKI) data (such as certificates, revocation lists, etc.), or other information that—while not confidential—could be abused by an adversary to elevate privileges, orchestrate denial-of-service (DoS) attacks, or expand control to other portions of the network. Various embodiments protect against these types of exploits by maintaining this information with an immutable and publicly auditable/verifiable distributed ledger (i.e. the BFT SMR system). This may also be used to enforce quorum-based access controls, potentially requiring approval from multiple administrators to modify particularly sensitive values.

These capabilities can be leveraged by other services provided by the DSE, as well as external services within the enterprise. For example, various embodiments may implement a decentralized IdAM service by storing, maintaining, and disseminating information related to identity and access privileges for users and/or services/devices both inside and outside of the network. This information can be used by other decentralized services to regulate access to restricted functions or digital assets, or by services in other parts of the network as a secure source for this highly sensitive policy information.

As a decentralized cryptographic key escrow provider, an embodiment system can additionally provide services for storing and manipulating sensitive, confidential data for the wider enterprise. These include potential functions such as secret storage/management, data protection services, secure communications, etc. Because the resulting system is not limited by end-to-end encryption, access to protected data may be dynamically managed and verifiably audited without requiring involvement by a client or other trusted party.

As one example, a system may be constructed with the following layers:

Layer 402: 7 physical nodes with collocal layer 404 and 406 principals. These nodes are divided into 4 security/trust zones, each with a designated administrator and assigned OS (such that each node utilizes the OS assigned to its trust zone). A proactive recovery protocol is enforced wherein nodes are refreshed on a periodic basis in a round robin manner. The mechanisms enforcing this protocol for each zone are maintained by the zone's administrator.

Layer 404: All nodes independently execute operations to participate in a permissioned BFT SMR protocol with a Blockchain paradigm (i.e. execution is marked by "blocks" of transactions over time) that provides safety and liveness guarantees at least equivalent to those of PBFT with a BFT threshold of strictly less than one-third (i.e. an adversary controlling 2 or fewer nodes in this system cannot violate correctness of BFT SMR).

Layer 406: A recovery threshold of 3 is defined for threshold cryptographic operations within the system (i.e. an adversary controlling 2 or fewer nodes with partial decryption keys may not access the shared private key or decrypt TDH ciphertexts encrypted for the system). Additionally, a Blockchain Epoch protocol is defined with a variable threshold 526 that adjusts the length of each Epoch based on a deterministic calculation representing the time duration of past Epochs. For example, each node may broadcast a timestamp value at the beginning of each Epoch, compute an outlier resistant average (e.g. median, trimmed mean, etc.) of all broadcast values, and use this computed value to deterministically derive an adjusted threshold 526. Other Blockchain Epoch phases operate similarly to FIG. 5.

Layer 408: The API includes a local agent that may run on a client device. This may run as a daemon/proxy/etc. on the client device that receives requests from a UI (user interface) application that a human user may use to interact with the system. This local agent may authenticate as the client in order to communicate directly with individual nodes via RPC, REST, etc. The API may also include software libraries, etc. allowing the UI application to interact with the local agent.

In one possible application, a client (e.g., 602) may use this example system as a key escrow service for managing access to encrypted documents stored in an external cloud service. The client may store a document in this way requesting the DSE system's public key (e.g., generated by DKG). Though this public key is known to all nodes, compromised nodes may send incorrect values for the public key when requested. Therefore, the API must send requests to multiple nodes for this value and confirm that at least a threshold number of matching responses are received to ensure that the correct public key is received. The client may then encrypt a document via standard means, such as symmetric key encryption (e.g. AES) using a randomly generated (secret) document encryption key. The client may then upload the encrypted document (along with any required metadata) to the external cloud service and submit the document encryption key to the API. The API may then encrypt the document encryption key using the DSE system's public key and submit this as a "put" request (e.g., 616) to be stored by the DSE.

The client may later access the decrypted file by submitting a "get" request (e.g., 624) to the API. The API, in turn, may request (e.g., 626) partial decryption shares from the nodes in the system. The nodes may evaluate these requests by (at least) verifying the access policy label embedded in the ciphertext requested for decryption. Access policy information may be stored on a DL. If the access policy authorizes the requesting client to access the requested ciphertext, the node will return a partial decryption share (e.g., 628). Once the API has received at least 3 valid shares, it may reconstruct the document encryption key to be returned to the client (e.g., 630). The client may then retrieve the encrypted document from the external cloud service and decrypt it using the document encryption key.

Additionally, the client may grant access to other users for this document (e.g., if a relevant access policy permits this). To do this, the client may submit a request to the API, which in turn submits a request to the DSE. The nodes will receive this request and, if the submitting user is authorized, update the policy. Depending on the access policy structures supported, this can be used to add/remove access to certain policies for individual users, or more sophisticated logic may be employed, such as RBAC (role-based access controls), etc. Once authorized, other users may follow the same steps described above in order to access the document.

As another example, a malicious administrator (e.g., 134) may exploit their privileged access to compromise nodes within their trust zone and potentially access partial decryption keys stored therein. However, because each trust zone only contains at most two nodes (in this example), the malicious administrator must gain access to information from at least one node outside of their zone in order to meet the recovery threshold. The malicious administrator could potentially exfiltrate partial decryption keys from the nodes available to the malicious administrator (e.g., 112, 114) while the malicious administrator attempts to gain access to another zone (e.g., 104, 106, 108); however, upon each Epoch transition, all correct nodes may securely evict inactive partial decryption keys from memory. Thus, any partial keys exfiltrated by the malicious administrator become unusable once their validity period has expired, because all other compatible partial keys from the respective set will be unrecoverable. Unless an attacker is able to access information from nodes in multiple zones simultaneously or move from one zone to another and exfiltrate information before the relevant Epoch expires, a single administrator should not be able to obtain information about, e.g., TDH encrypted secrets, or the collective secret, without cooperating with other actors within the organization.

Figure 13:
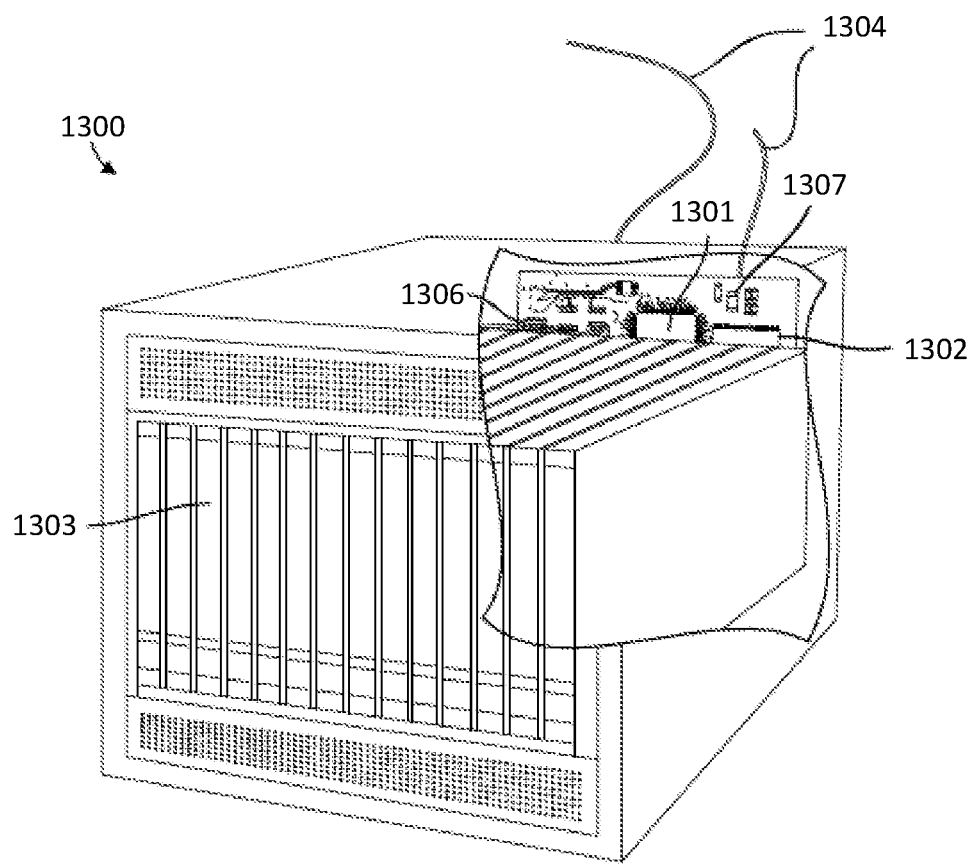
FIG. 13 is a component block diagram of a network computing device suitable for use with various embodiments.

Various embodiments may be implemented on a variety of network devices, an example of which is illustrated in FIG. 13 in the form of a network computing device 1300 functioning as a network element of a communication network, such as a base station (e.g., computing devices 112, 114, 116, 118, 120, 122, 124). Such network computing devices may include at least the components illustrated in FIG. 13. With reference to FIGS. 1-13, the network computing device 1300 may typically include a processor 1301 coupled to volatile memory 1302 and a large capacity nonvolatile memory, such as a disk drive 1303. The network computing device 1300 may also include a peripheral memory access device, such as a floppy disc drive, compact disc (CD) or digital video disc (DVD) drive 1306 coupled to the processor 1301. The network computing device 1300 may also include network access ports 1304 (or interfaces) coupled to the processor 1301 for establishing data connections with a network, such as the Internet and/or a local area network coupled to other system computers and servers. The network computing device 1300 may include one or more antennas 1307 for sending and receiving electromagnetic radiation that may be connected to a wireless communication link. The network computing device 1300 may include additional access ports, such as USB, Firewire, Thunderbolt, and the like for coupling to peripherals, external memory, or other devices.

The foregoing method descriptions and the diagrams are provided merely as illustrative examples and are not intended to require or imply that the operations of various embodiments must be performed in the order presented. As will be appreciated by one of skill in the art, the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the principles and novel features disclosed herein.

What is claimed is:

1. A method of providing information security services for a communication network, comprising:
   performing, by a processing system in at least one of a plurality of computing devices, a consensus operation to determine whether consensus exists among a plurality of trust zones for authorizing a client device to perform a document operation, wherein:
     each trust zone in the plurality of trust zones includes a number of the plurality of computing devices that is less than or equal to a threshold number of computing devices; and
     the consensus operation includes evaluating compliance with a dynamic access policy that is updated based on current network conditions and previous consensus outcomes; and
   performing the document operation for the client device in response to determining that consensus exists among the plurality of trust zones authorizing the client device to perform the document operation, wherein the document operation is performed using a verification protocol that evaluates the integrity and confidentiality requirements of the document based on the type of operation requested.

2. The method of claim 1, wherein performing the consensus operation comprises performing the consensus operation in response to receiving a request from the client device for the document operation to be performed by the communication network.

3. The method of claim 1, wherein performing the consensus operation comprises:
generating an access policy by the consensus operation indicating whether the client device is authorized to request a document operation; and
applying the access policy to a request from the client device to perform the document operation.

4. The method of claim 1, wherein performing the document operations comprises at least one of:
storing information in the communication network,
retrieving information from the communication network,
entering information into the communication network for encryption, or
obtaining information from the communication network for decryption.

5. The method of claim 1, wherein performing the consensus operation further comprises determining whether a client device is authorized to request partial decryption shares for encrypted information stored in the communication network.

6. The method of claim 5, wherein performing the document operation comprises sending to the client device the partial decryption shares in response to determining by the plurality of computing devices that the client device is authorized to request the partial decryption shares for encrypted information stored in the communication network.

7. The method of claim 1, wherein the plurality of computing devices are configured with different operating systems, different applications, or different versions of application software to implement diversity across space and limit an impact of a vulnerability in any one operating system, application, or application version.

8. The method of claim 1, further comprising:
selecting a computing device from among the plurality of computing devices;
reverting the selected computing device to a known good state; and
performing by at least some of the plurality of computing devices a consensus operation to recover state information for the reverted computing device.

9. The method of claim 1, further comprising performing, by at least a participating subset of the plurality of computing devices, a distributed key generation operation to generate a public encryption key available to each computing device and a partial decryption key share that is different for each of the computing devices of the participating subset.

10. The method of claim 9, wherein performing, by at least a participating subset of the plurality of computing devices, a distributed key generation operation to generate a public encryption key available to each computing device and a partial decryption key share that is different for each of the computing devices of the participating subset comprises:
performing a distributed key generation operation during a first time period to generate a first partial decryption key share that is different for each of the computing devices of the participating subset; and
performing a verifiable secret redistribution operation during a second time period to generate a second partial decryption key share that is different for each of the computing devices of the participating subset;
wherein the first time period and the second time period are defined by the performance of the consensus operation by the plurality of computing devices.

11. The method of claim 10, wherein the computing devices of the participating subset use the first partial decryption key share during the second time period.

12. The method of claim 10, further comprising performing a second verifiable secret redistribution operation during a third time period to generate a third partial decryption key share that is different for each of the computing devices of the participating subset.

13. The method of claim 1, wherein performing the consensus operation comprises performing Byzantine Fault Tolerant State Machine Replication operations to determine whether a consensus exists among the plurality of computing devices that the client device is authorized to request the document operation.

14. The method of claim 1, wherein performing the consensus operation comprises each of the plurality of computing devices performing an independent consensus operation and sharing the results via a secure distributed ledger accessible by each the plurality of computing devices.

* * * * *